United States Patent
Wei et al.

(10) Patent No.: US 8,429,000 B2
(45) Date of Patent: Apr. 23, 2013

(54) SPECIAL-ORDERED-SET-BASED COST MINIMIZATION

(75) Inventors: Min Wei, Redmond, WA (US); Alexander S. Stojanovic, Redmond, WA (US); John Oberon, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 407 days.

(21) Appl. No.: 12/475,940

(22) Filed: Jun. 1, 2009

(65) Prior Publication Data
US 2010/0306009 A1 Dec. 2, 2010

(51) Int. Cl.
*G06Q 30/00* (2012.01)

(52) U.S. Cl.
USPC ............................................. 705/7.35

(58) Field of Classification Search ............... 705/7.35
See application file for complete search history.

(56) References Cited

U.S. PATENT DOCUMENTS

| | | | |
|---|---|---|---|
| 5,216,593 A * | 6/1993 | Dietrich et al. | 345/467 |
| 5,315,562 A | 5/1994 | Bradley | |
| 5,937,042 A | 8/1999 | Sofman | |
| 7,277,832 B2 | 10/2007 | Chiang | |
| 2001/0051936 A1* | 12/2001 | Michalewicz | 706/46 |
| 2002/0183987 A1* | 12/2002 | Chiang | 703/2 |

OTHER PUBLICATIONS

Beale, E.M.L., and Forrest, J.J.H., "Global Optimization Using Special Ordered Sets," Mathematical Programming, 10, 1976, pp. 52-69.*

Kennedy, D., "Some Branch and Bound Techniques for Nonlinear Optimization," Mathematical Programming, 42, 1988, pp. 147-157.*

"Simplex Algorithm," Wikipedia article, version dated May 27, 2009.*

"Special Ordered Set," Wikipedia article, version dated Sep. 20, 2008.*

J.B. Rosen and P.M. Pardalos, Global Minimization of Large-Scale Constrained Concave Quadratic Problems by Separable Programming, 12 pp, Revised manuscript, Mathematical Programming 34 (1986) 163-174 North-Holland, http://www.springerlink.com/content/v10473j786648040/fulltext.pdf.

AIMMS—LGO Solver Information, 1 page, 1989-2009 Paragon Decision Technology, Apr. 7, 2009, http://www.aimms.com/features/solvers/lgo.

AIMMS—BARON Solver Information, 1 page, 1989-2009 Paragon Decision Technology, Apr. 7, 2009, http://www.aimms.com/features/solvers/baron.

Benjamin W. Wah and Yixin Chen, Solving Large-Scale Nonlinear Programming Problems by Constraint Partitioning, Department of Electrical and Computer Engineering and the Coordinated Science Laboratory University of Illinois, Urbana-Champaign, Urbana, IL, 15 pp, Research supported by National Science Foundation Grant IIS 03-12084, http://www.cse.wustl.edu/~chen/public/C154.pdf.

(Continued)

*Primary Examiner* — Nathan Erb

(74) *Attorney, Agent, or Firm* — Shook, Hardy & Bacon L.L.P.

(57) ABSTRACT

An embodiment of the invention is directed toward determining a solution to an objective function that is to be maximized or minimized. An initial feasible basis is determined. An entering variable is determined to enter the initial feasible basis. It is determined if there is an exiting variable. While there is an exiting variable, the exiting variable is removed from the feasible basis, the entering variable is added to the feasible basis, and a new entering variable is determined.

11 Claims, 3 Drawing Sheets

OTHER PUBLICATIONS

Wikipedia, Special Ordered Set, 1 page, Apr. 9, 2009, http://en.wikipedia.org/wiki/Special_ordered_set.

Edward Yu-Hsien Lin and Dennis L. Bricker, Connecting Special Ordered Inequalities and Transformation; 6 pp, http://www.cc.ntut.edu.tw/~line/Connecting%20special%20ordered%20inequalities%20and%20reformulation%20and%20transformation%20technique.pdf.

A Branch-and-Cut Algorithm Without Binary Variables for Nonconvex Piecewise Linear Optimization, Source: Operations Research, Publication Date: Sep. 1, 2006, 3 pp, http://www.accessmylibrary.com/comsite5/bin/aml_landing_tt.pl?purchase_type=ITM&item_id=0286-32769532&action=print&page=aml_article_print.

E.M.L. Beale & J.A. Tomlin, Special Facilities in a General Mathematical Programming System for Non-convex Problems Using Ordered Sets of Variables, 8 pp, E.M.L. Beale & A. Tomlin 1970, http://www-staff.it.uts.edu.au/tomlin/sos.pdf.

E.M.L. Beale and J.J.H. Forrest, Global Optimization Using Special Ordered Sets, 18 pp, Mathematical Programming 10 (1976) 52-69, North-Holland Publishing Company, Scientific Control Systems Ltd, Milton Keynes, Great Britain, Revised manuscript, http://www.springerlink.com/contentq4r1760581nh852k/fulltext.pdf.

Graf, et al., "Simulation of Hybrid Circuits in Constraint Logic Programming" TOOLS, pp. 72-77.

Noble, et al., "Applied Linear Algebra, 2nd Ed.," Prentice-Hall, Inc., Englewood Cliffs, NJ, 1977, Linear Programming, Chapter Seven, Sections 7.1-7.3, pp. 213-232.

\* cited by examiner

US 8,429,000 B2

SPECIAL-ORDERED-SET-BASED COST MINIMIZATION

INTRODUCTION

A large number of business optimizations (e.g., ad placement decisions and supply chain decisions) have a large number of variables and constraints to consider. Such problems can be solved as nonlinear programs. However, nonlinear programs take considerable computation time to solve. For business optimizations with very large numbers of variables, standard methods consume to many resources and take to long to compute.

SUMMARY

This Summary is generally provided to introduce the reader to one or more select concepts described below in the Detailed Description in a simplified form. This Summary is not intended to identify the invention or even key features, which is the purview of claims below, but is provided to be patent-related regulation requirements.

One embodiment of the invention includes determining a solution to an objective function to be maximized or minimized subject to constraints. One or more of the objective function and the constraints could contain nonlinear components. An initial feasible basis is determined. An entering variable is determined to enter the initial feasible basis. The entering variable is determined to be from a particular special ordered set and there is no other variables in the initial feasible basis that is from the same special ordered set or the entering variable is determined to be from a particular special ordered set and is adjacent to an exactly one other variable in the feasible basis that is from the same special ordered set.

It is determined if there is an exiting variable. While an exiting variable can be determined, the exiting variable is removed from the initial feasible basis, the entering variable is added to the initial feasible basis, and a new entering variable is determined. The new entering variable is determined to be from a particular special ordered set and there is no other variables in the initial feasible basis that is from the same special ordered set or the new entering variable is determined to be from a particular special ordered set and is adjacent to an exactly one other variable in the feasible basis that is from the same special ordered set.

BRIEF DESCRIPTION OF THE DRAWING

Illustrative embodiments of the present invention are described in detail below with reference to the attached drawing figures, and wherein.

DETAILED DESCRIPTION

Figure 1:
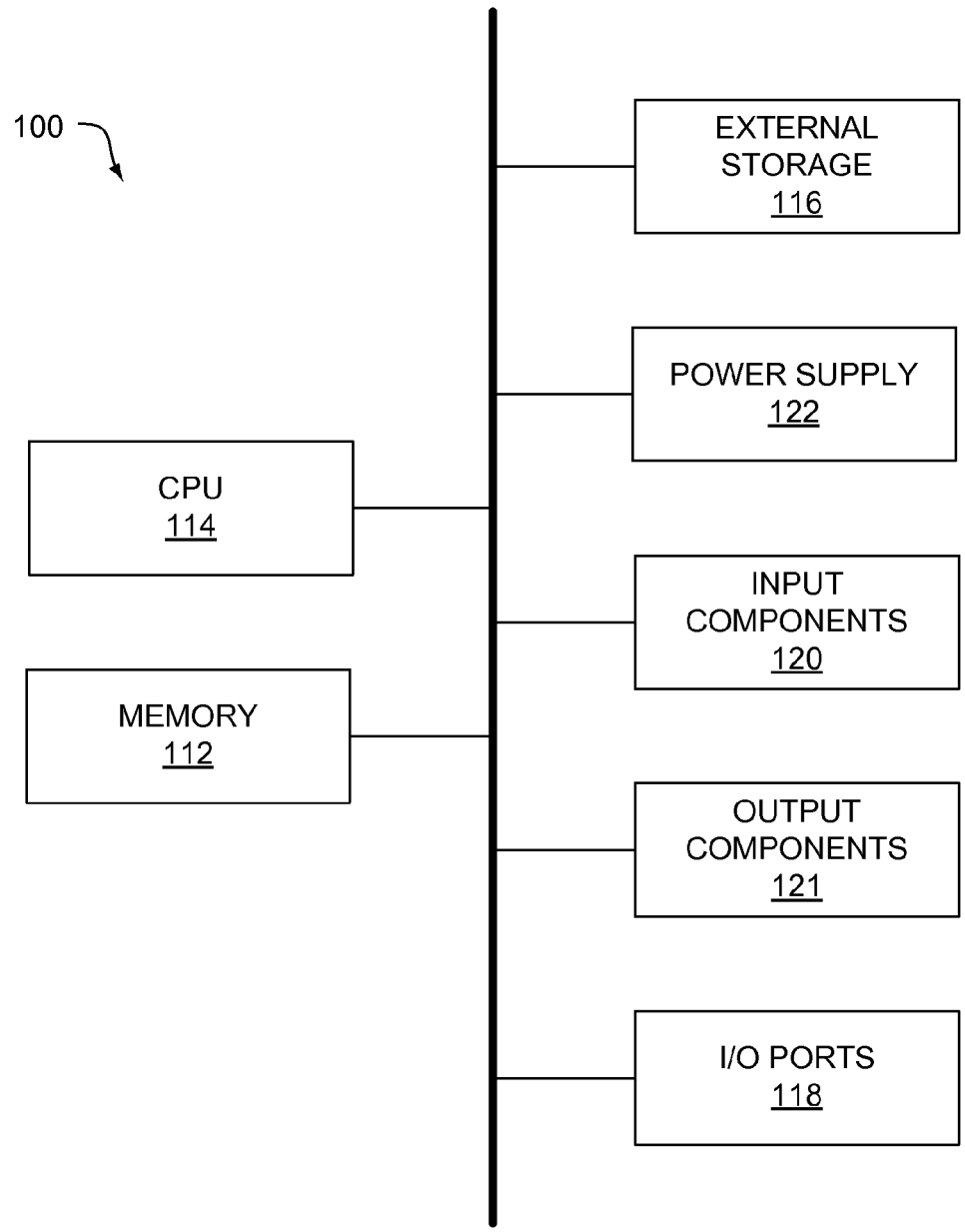
FIG. 1 is block diagram of a computing device suitable for embodiments of the invention.

The subject matter of the present invention is described with specificity to meet statutory requirements. However, the description itself is not intended to define the scope of the claims. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

Embodiments of the invention are directed toward determining a maximum or minimum solution to a nonlinear program. According to embodiments of the invention, a nonlinear program (NLP) is a process of maximizing or minimizing an objective function over a set of unknown variables, subject to a set of constraints, where each of the constraints and the objective function could be nonlinear. Such nonlinear programs can be used to solve a number of business optimizations. For example, the optimal method of organizing a supply chain can be modeled and solved as an NLP. A number of possible transportation methods could be used to ship raw supplies to a company for use in manufacturing goods. One or more of these shipping methods could exhibit economies of scale, each having various stops, costs, and capacities. Each cost function associated with each transportation method may have many discontinuities as well as exponential components. Choosing the transportation method or transportation methods that will result in the lowest overall cost can be modeled as an NLP. Consider now a number of different raw materials and products that all need to be received to manufacture particular goods, in this case, the NLP could become very complex, with many variables and constraints, each possibly containing nonlinear components.

There are other business optimizations that could be modeled as NLPs, in accordance with embodiments of the invention. By way of example, optimal placement of advertisements could be modeled as an NLP. As another example, the optimal scheduling of employees throughout a company could be modeled as an NLP.

NLPs can take a large amount of time to solve, even using very powerful computation devices. According to an embodiment of the invention, a heuristic is used to rapidly approximate a solution to an NLP, thereby producing a solution to a business optimization problem. A linear program, modified with a special ordered set constraint can be used to rapidly approximate a solution to a NLP. A special ordered set is an ordered set of variables, wherein either one or two of the variables can take on positive values. There are two types of special ordered sets. The first type of special ordered set (SOS1) is a set of ordered variables, where at most one of the variables in the set can take on strictly positive values. The second type of special ordered set (SOS2) is an ordered set of variables, where at most two of the variables in the set can take on strictly positive values. Furthermore, in an SOS2, if there are two variables in the set with strictly positive values, they must be adjacent variables. Sets of SOS2 can be embedded in various NLP techniques enable truly global optima to be found, as opposed to local optima.

In accordance with an embodiment of the invention, sets of SOS2 are embedded in a linear program to approximate a solution to an NLP. Each solution to an objective function that satisfies a related set of constraints, that together with the objective function define the NLP, is called a feasible set. Each feasible set, also called a feasible basis, contains a set of values for each of the variables that represent a solution to the objective function, subject to the set of constraints. The solution to a maximization problem involves finding the one or more feasible bases that maximize the objective function. According to an embodiment of the invention, the set of constraints can be used to define a polytope as a feasible region. One method of determining the feasible set that maximizes the objective function is to choose an initial feasible set and then walk the edges of the polytope. Assuming the objective function and constraints are strictly convex, a global maxima will be found.

According to an embodiment of the invention, the objective function of set of constraints can be written in augmented form, wherein inequalities are removed from the constraints through the addition of slack variables. Generally, if there are n variables in the standard form of the objective function and constraints and m slack variables, then finding a basic solution, or feasible basis, corresponds to finding a solution of the set of augmented equations such that m of the m+n variable are zero. The m variables that are set to zero are called nonbasic variables. The other n variables are the basic variables and can be uniquely solved for.

According to an embodiment of the invention, an initial feasible basis is chosen. At each step, an entering variable and an exiting variable is chosen, the entering variable is chosen from the nonbasic variables and the exiting variable is chosen from the basic variables. The variables are switched, so that the entering variable enters the basic set of variables and the exiting variable exits the basic variable set.

According to an embodiment of the equation, the entering variable is chosen as the variable that could most increase the value of the objective function. An exiting variable is then determined that, upon exiting would reduce the value of the objective function less that the entering variable will increase it. In this way, by switching the variables, the objective function will increase. If such an exiting variable can be found, the variables are switched and another step in the process is begun. If such an exiting variable cannot be found, then the previous basic set is the feasible solution that maximizes the objective function.

According to an embodiment of the invention, the selection of the entering variable is also subject to an SOS2 constraint. The field of variables are divided into one or more sets of SOS2. During selection of a new entering variable, if one of the other variables in the basic set is in an SOS2, then if the chosen variable to enter is in the same SOS2, it must be adjacent to the variable from the SOS2 currently in the basic set. If there are currently two variables from an SOS2 in the basic set, no other variable from the same SOS2 can be chosen as an entering variable. If there are no variables in the basic set from an SOS2, then any variable can be chosen as an entering variable.

Some embodiments of the invention are directed to maximizing or minimizing an objective function subject to constraints, where one or more of the objective function and the constraints contain nonlinear components. One or more of the objective function and the constraints could contain nonlinear components. An initial feasible basis is determined. An entering variable is determined to enter the initial feasible basis. The entering variable is determined to be from a particular special ordered set and there is no other variables in the initial feasible basis that is from the same special ordered set or the entering variable is determined to be from a particular special ordered set and is adjacent to an exactly one other variable in the feasible basis that is from the same special ordered set.

It is determined if there is an exiting variable. While an exiting variable can be determined, the exiting variable is removed from the initial feasible basis, the entering variable is added to the initial feasible basis, and a new entering variable is determined. The new entering variable is determined to be from a particular special ordered set and there is no other variables in the initial feasible basis that is from the same special ordered set or the new entering variable is determined to be from a particular special ordered set and is adjacent to an exactly one other variable in the feasible basis that is from the same special ordered set.

According to embodiments of the invention, the objective function could be a system of functions. The objective function could be identified by deriving the objective function to model the cost of a vendor supply chain. The objective function could be derived to model the cost of advertisement placement. The objective function could be derived to model the cost of various employee work schedules.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more external storage components 116, input/output (I/O) ports 118, input components 120, output components 121, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, many processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100.

Memory 112 includes computer-storage media in the form of volatile memory. Exemplary hardware devices include solid-state memory, such as RAM. External storage 116 includes computer-storage media in the form of non-volatile memory. The memory may be removable, nonremovable, or a combination thereof. Exemplary hardware devices include solid-state memory, hard drives, optical-disc drives, etc. Computing device 100 includes one or more processors that read data from various entities such as memory 112, external storage 116 or input components 120. Output components 121 present data indications to a user or other device. Exemplary output components include a display device, speaker, printing component, vibrating component, etc.

I/O ports 118 allow computing device 100 to be logically coupled to other devices including input components 120 and output components 121, some of which may be built in. Illustrative components include a microphone, joystick, game pad, satellite dish, scanner, printer, wireless device, etc.

Figure 2A:
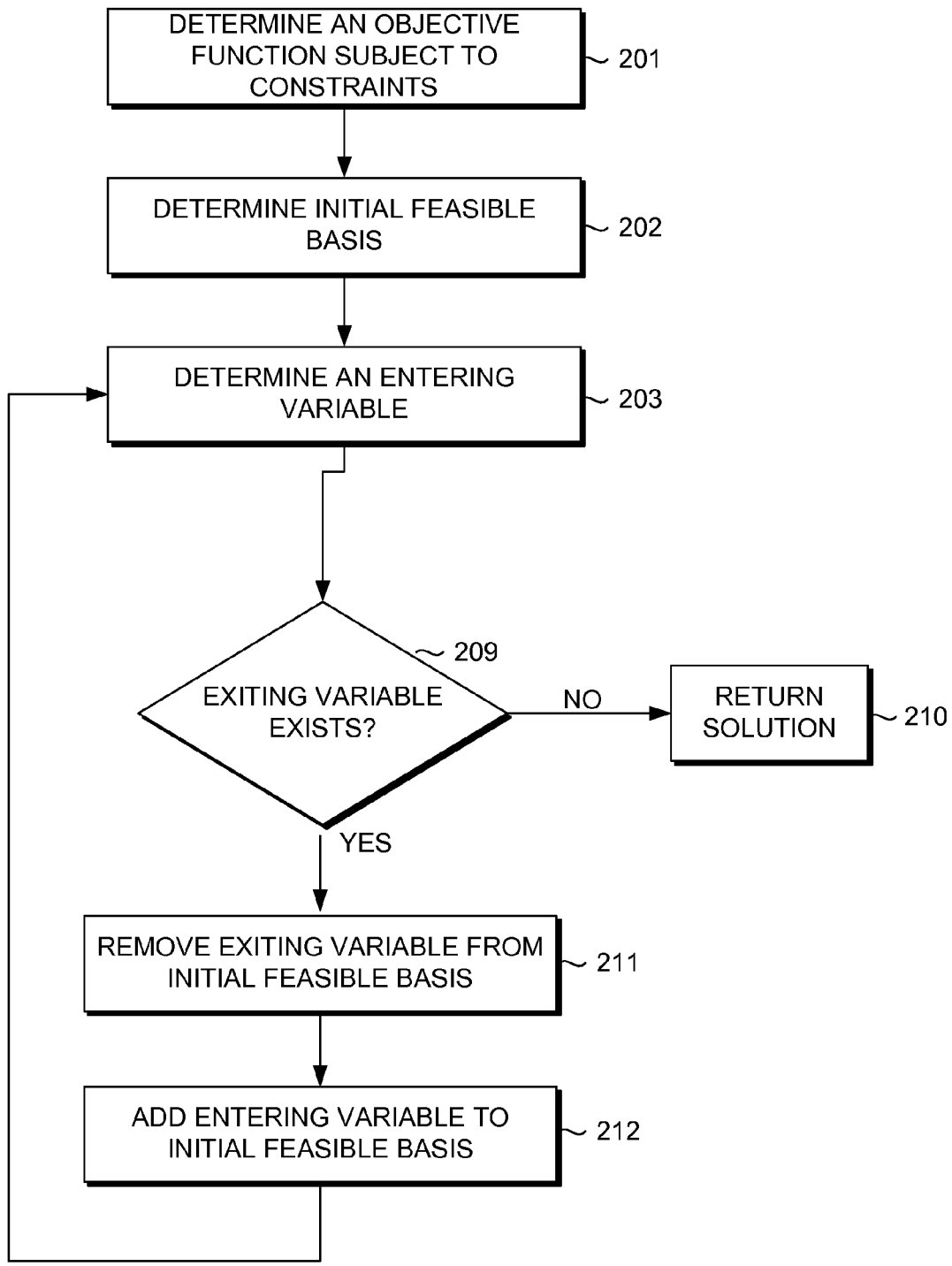
FIGS. 2A and 2B are flow diagrams depicting methods of maximizing or minimizing an objective function subject to constraints.
Figure 2B:
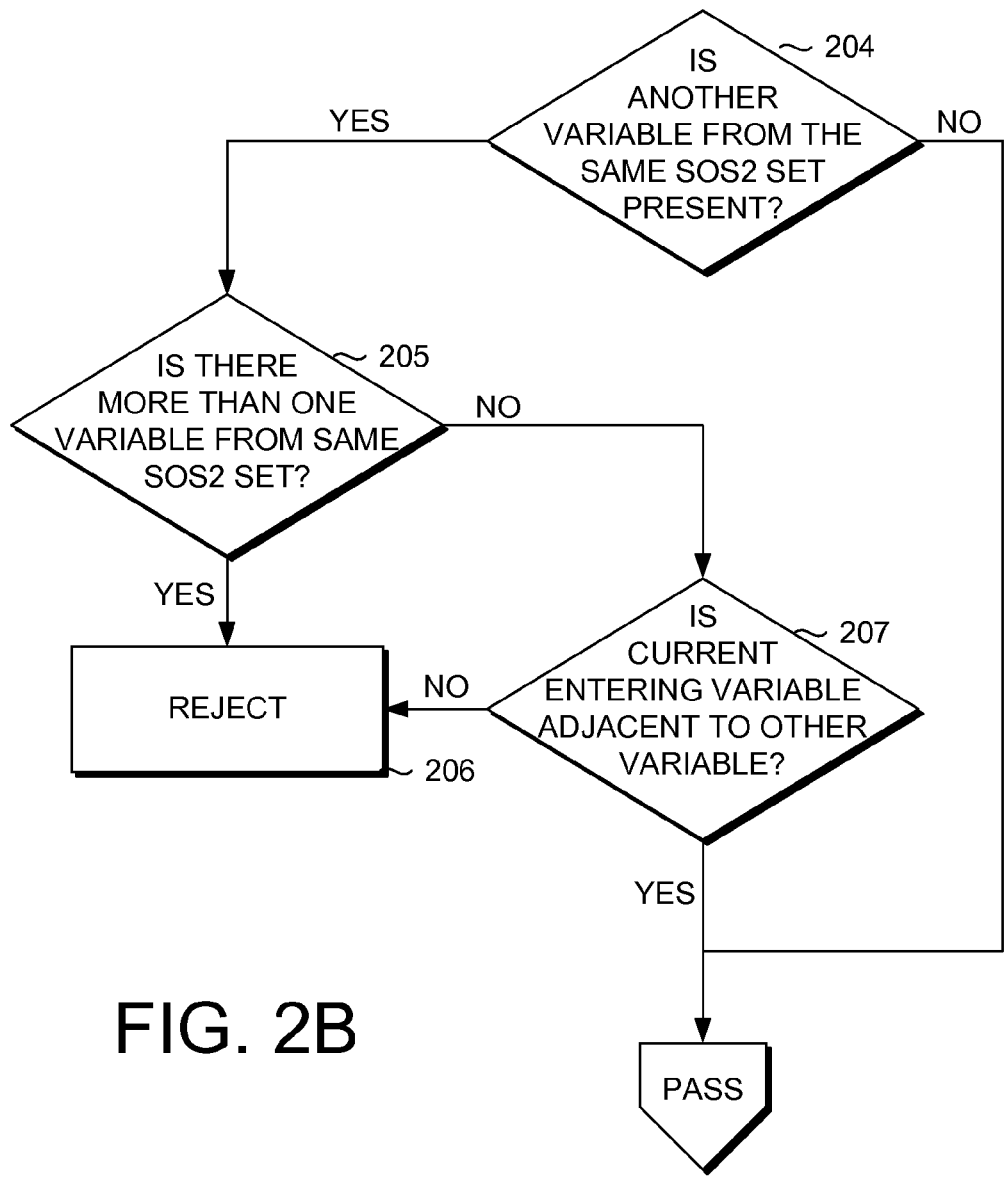

Turning to FIG. 2A-2B, a flow diagram depicting a method of minimizing the cost of a vendor supply chain is given. An objective function subject to a set of one or more constraints is determined, as shown at block 201. According to an embodiment of the invention, the objective function could contain nonlinear components. Additionally, one or more of the constraints could contain nonlinear components. The objective function could be determined by modeling a particular cost function to solve. By way of example, the objective function could be derived by modeling the cost of a supply chain composed of various vendors. As another example, the objective function could be derived by modeling the cost of placing various advertisements in a set of locations. As a further example, the cost function could be derived by modeling the cost associated with schedules a large number of employees to work various shifts. According to an embodiment, the one or more constraints could also be derived from models. Objective functions could either be minimize or maximized, in accordance with embodiments of the invention. Additionally, according to some embodiments of the invention, the objective function could be a system of equations.

An initial feasible basis is determined, as shown at block 202. According to some embodiments of the invention, the initial feasible basis could be determined by first converting any inequalities in the set of constraints to equalities by adding variables. The system of equations made up of the objective function and the new set of constraints could be solved by setting the new variables added to the constraints to zero to determine the initial feasible basis.

An entering variable is determined, as shown at block 203. According to an embodiment, an entering variable could be determined by choosing the variable in the set of equations that is currently not in the feasible basis that would, if added, increase the value of the objective function the most. If the objective function is to be minimized, then the entering variable could be chosen accordingly. There are other ways in which an entering variable could be determined. The choice of entering variable, in accordance with embodiments of the invention, also depends on the SOS2 constraint, which is depicted in blocks 204, 205, and 207.

It is determined a variable already exists in the feasible basis from the same SOS2 as the new entering variable, as shown at block 204. If no variable from the same SOS2 exists in the feasible basis, an exiting variable is determined, as shown at block 209. If a variable from the same SOS2 does exist in the feasible basis, it is determined if more than one variable from the same SOS2 exists in the feasible basis, as shown at block 205. If more than one exists, then the current entering variable is rejected, as shown at block 206 and a new entering variable is determined, as shown at block 203. If more than one variable from the same SOS2 as the entering variable is not in the feasible basis, it is determined if the currently chosen entering variable is adjacent to the other variable in the feasible basis that is from the same SOS2, as shown at block 207.

If the new entering variable is not adjacent to the other variable from the same SOS2, the entering variable is rejected, as shown at block 206, and a new entering variable is determined, as shown at block 203. If the new entering variable is adjacent to the other variable in the feasible basis from the same SOS2, an exiting variable is determined, as shown at block 209. There are a number of ways, in accordance with embodiments of the invention, that an exiting variable could be determined. For example, the variable that would reduce the value of the objective function the least while preserving a net increase in the objective function given the increase due to the entering variable could be chosen as an exiting variable. If the objective function is to be minimized, the exiting variable could be chosen accordingly. A determination as to whether an exiting value could be determined is made, as shown at block 209.

If no exiting variable could be determined, the current feasible basis is returned as the feasible basis that maximizes or minimizes the objective function, as shown at block 210. If an exiting variable is determined, the exiting variable is removed from the feasible basis, as shown at block 211 and the entering variable is added to the feasible basis, as shown at block 212. A new entering variable is determined, as shown at block 213, similar to block 203 and the SOS2 constraint is applied to the choice of entering variable, beginning at block 204.

Alternative embodiments and implementations of the present invention will become apparent to those skilled in the art to which it pertains upon review of the specification, including the drawing figures. Accordingly, the scope of the present invention is defined by the claims that appear in the "claims" section of this document, rather than the foregoing description.

The invention claimed is:

1. A computer system comprising:
 a processor; and
 a memory, communicatively coupled to the processor;
 wherein the computer system is configured to perform a method of minimizing the cost of a vendor supply chain, the method comprising:
 identifying an objective function to be minimized related to the cost of the vendor supply chain, subject to one or more constraints, wherein the one or more constraints or the objective function is nonlinear;
 determining an initial feasible basis by the computing device;
 determining an entering variable to enter the initial feasible basis, wherein the entering variable is from a particular special ordered set and there are no other variables in the initial feasible basis from the particular special ordered set, or is adjacent to an exactly one variable in the initial feasible basis that is from the particular special ordered set;

determining that there is an exiting variable in the initial feasible basis;

based on the determination that there is an exiting variable in the initial feasible basis, and while there is an exiting variable in the feasible basis, iterating over the following steps:

removing the exiting variable from the feasible basis, adding the entering variable to the feasible basis, determining a new entering variable to be the entering variable, wherein: the new entering variable is from a particular special ordered set and there are no other variables in the feasible basis from the particular special ordered set, or the new entering variable is adjacent to an exactly one variable in the feasible basis that is from the particular special ordered set, and determining if there is a new exiting variable in the feasible basis to be the exiting variable; and outputting the final feasible basis.

2. The media of claim 1, wherein the objective function is a system of equations.

3. A computer system comprising:

a processor; and a memory, communicatively coupled to the processor;

wherein the computer system is configured to perform a method of minimizing the cost of advertisement placement, the method comprising:

identifying an objective function to be minimized related to the cost of advertising placement, subject to one or more constraints, wherein the one or more constraints or the objective function is nonlinear;

determining an initial feasible basis by the computing device;

determining an entering variable to enter the initial feasible basis, wherein the entering variable is from a particular special ordered set and there are no other variables in the initial feasible basis from the particular special ordered set, or is adjacent to an exactly one variable in the initial feasible basis that is from the particular special ordered set;

determining that there is an exiting variable in the initial feasible basis;

based on the determination that there is an exiting variable in the initial feasible basis, and while there is an exiting variable in the feasible basis, iterating over the following steps:

removing the exiting variable from the feasible basis, adding the entering variable to the feasible basis, determining a new entering variable to be the entering variable, wherein: the new entering variable is from a particular special ordered set and there are no other variables in the feasible basis from the particular special ordered set, or the new entering variable is adjacent to an exactly one variable in the feasible basis that is from the particular special ordered set, and determining if there is a new exiting variable in the feasible basis to be the exiting variable; and outputting the final feasible basis.

4. The media of claim 3, wherein the objective function is a system of equations.

5. A computer system comprising:

a processor; and a memory, communicatively coupled to the processor;

wherein the computer system is configured to perform a method of determining a solution to an objective function to be maximized or minimized, subject to one or more constraints, wherein the one or more constraints or the objective function is nonlinear, the method comprising:

determining an initial feasible basis by the computing device;

determining an entering variable to enter the initial feasible basis, wherein the entering variable is from a particular special ordered set and there are no other variables in the initial feasible basis from the particular special ordered set, or is adjacent to an exactly one variable in the initial feasible basis that is from the particular special ordered set;

determining that there is an exiting variable in the initial feasible basis;

based on the determination that there is an exiting variable in the initial feasible basis, and while there is an exiting variable in the feasible basis, iterating over the following steps:

removing the exiting variable from the feasible basis, adding the entering variable to the feasible basis, determining a new entering variable to be the entering variable, wherein: the new entering variable is from a particular special ordered set and there are no other variables in the feasible basis from the particular special ordered set, or the new entering variable is adjacent to an exactly one variable in the feasible basis that is from the particular special ordered set, and determining if there is a new exiting variable in the feasible basis to be the exiting variable; and outputting the final feasible basis.

6. The media of claim 5, wherein the objective function is to be minimized.

7. The media of claim 5, wherein the objective function is to be maximized.

8. The media of claim 5, wherein the objective function is a system of equations.

9. The media of claim 5, wherein the objective function is related to the cost of a supply chain.

10. The media of claim 5, wherein the objective function is related to the cost of advertising placement.

11. The media of claim 5, wherein the objective function is related to creating employee work schedules.

* * * * *